United States Patent
Altmayer et al.

(10) Patent No.: US 12,460,675 B2
(45) Date of Patent: Nov. 4, 2025

(54) ROLLING BEARING AND INTERMEDIATE PIECE THEREFOR

(71) Applicant: Liebherr-Components Biberah Gmbh, Biberach an der Riss (DE)

(72) Inventors: Thomas Altmayer, Gutenzell-Hürbel (DE); Lennart Schierholz, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 101 days.

(21) Appl. No.: 18/325,856

(22) Filed: May 30, 2023

(65) Prior Publication Data

US 2023/0358275 A1 Nov. 9, 2023

Related U.S. Application Data

(63) Continuation of application No. PCT/EP2021/083576, filed on Nov. 30, 2021.

(30) Foreign Application Priority Data

Nov. 30, 2020 (DE) ...................... 10 2020 131 634.8

(51) Int. Cl.
*F16C 33/37* (2006.01)
*F16C 19/20* (2006.01)

(52) U.S. Cl.
CPC .......... *F16C 33/3706* (2013.01); *F16C 19/20* (2013.01)

(58) Field of Classification Search
CPC ...... F16C 19/20; F16C 33/37; F16C 33/3706; F16C 33/372; F16C 33/374
See application file for complete search history.

(56) References Cited

U.S. PATENT DOCUMENTS

| 4,175,805 A | * | 11/1979 | Becker | ................... F16C 19/20 |
| | | | | 384/520 |
| 7,758,245 B2 | * | 7/2010 | Ishihara | ............. F16C 29/0638 |
| | | | | 384/51 |
| 2017/0074322 A1 | * | 3/2017 | Pattakos | ............. F16C 33/3713 |

FOREIGN PATENT DOCUMENTS

| CN | 202073926 U | * 12/2011 |
| DE | 2610707 C2 | 4/1978 |
| DE | 102015223511 | 2/2017 |
| FR | 2343922 | 10/1977 |
| JP | 2001-214930 | 8/2001 |
| JP | 2002-173951 | 6/2002 |
| WO | WO 2019/048251 | 3/2019 |

(Continued)

OTHER PUBLICATIONS

Liebherr's "Large rolling bearings product catalog".

*Primary Examiner* — James Pilkington
(74) *Attorney, Agent, or Firm* — Levine Bagade Han LLP

(57) ABSTRACT

Described herein is a rolling bearing having two concentric raceways between which there are provided, in a bearing gap, a plurality of rolling bodies which roll on at least two tracks, wherein intermediate pieces which keep the rolling bodies spaced apart from one another are provided between the rolling bodies, wherein the intermediate pieces each comprise a central portion which is connected via connecting struts to an outer frame part surrounding the central portion, wherein the frame part takes the form of a bar structure or skeleton structure with window-like and/or door arch-like cutouts.

15 Claims, 4 Drawing Sheets

(56) References Cited

FOREIGN PATENT DOCUMENTS

| WO | WO 2019/201662 | 10/2019 |
| WO | WO 2022/112600 | 6/2022 |

* cited by examiner

ROLLING BEARING AND INTERMEDIATE PIECE THEREFOR

CROSS-REFERENCE TO RELATED APPLICATIONS

This application is a continuation of International Patent Application Number PCT/EP2021/083576 filed Nov. 30, 2021, which claims priority to German Patent Application Number DE 10 2020 131 634.8 filed Nov. 30, 2020, the contents of which are incorporated herein by reference in their entireties.

BACKGROUND

The present invention relates to a rolling bearing having two concentric raceways between which there are provided, in a bearing gap, a plurality of rolling bodies which roll on at least two tracks, wherein intermediate pieces which keep the rolling bodies spaced apart from one another are provided between the rolling bodies. The invention further relates to intermediate pieces for such rolling bearings.

In order to keep the rolling bodies of a rolling bearing spaced apart from one another and to arrange them in an evenly distributed manner in the direction of running, intermediate pieces or rolling body cages are usually used. If, for example, rolling bodies in the form of balls are used, the intermediate pieces are usually cylindrical pieces whose end faces are approximately hemispherical concavities or depression-shaped, so that a respective intermediate piece with the end face depressions can nestle against preceding and following balls, cf. for example WO 2019/048251 A1.

In this respect, the cylindrical ring portion of the intermediate piece is usually connected to a central portion by connecting struts, as shown, for example, in Liebherr's "Large rolling bearings product catalog". Said connecting struts there configure the end face depressions together with the central portion and the ring portion. Alternatively, however, a closed-walled depression can also be provided, as shown schematically in WO 2019/048251 A1.

Depending on the shape of the rolling body, said intermediate pieces can be contoured differently or adapted to the shape of the rolling body, wherein, for example, in case of cylindrical rollers, there can be configured end face depressions adapted to the shape of the cylinder.

Such conventional intermediate pieces take up a relatively large amount of space in the bearing or bearing gap, so that relatively little space is available for the lubricant to be introduced into the bearing. For example, in large rolling bearings with life-time lubrication, as shown for example in WO 2019/201662 A1, the lubricant is usually stored in the bearing gap. In this respect, not only is the space required by the intermediate piece itself detrimental to the amount of lubricant that can be stored, but there is also the problem of old grease being deposited in the depressions of the intermediate piece, which impairs the supply of fresh lubricant to the rolling bodies.

More space for the lubricant is available when there are used rolling body cages. With a pivot bearing, the rolling element cage forms a ring in which cutouts for the rolling bodies are provided at a uniform division so that each rolling body is engaged around by the rolling body cage and adjacent rolling bodies are spaced apart from one another by a corresponding web.

The circumstance is, however, disadvantageous with such rolling body cages that the tracks are shortened at their margins viewed in cross-section since the rolling body cages require space at the interface between the two tracks so that the required gap between two adjacent tracks requires a certain thickness to be able to receive the lateral margins of the rolling body cage. The rolling body cage typically runs in a plane perpendicular to the main support direction of the rolling bearing, that is, in a plane perpendicular to the direction of rotation with an axial bearing and along a cylindrical surface between the outer ring and the inner ring with a radial bearing.

A shortening of the cross-sectional extent of the tracks at their margins can particularly produce a so-called edge loading with large rolling bearings, but also with other rolling bearings subject to a high load, i.e. very high spot loads occur at the shortened edges between the rolling bodies and the track. With ball bearings, for example, the tracks of bearings subject to high loads nestle relatively far toward the respective hemispherical shape viewed in cross-section. If the margins of these tracks are shortened for said reason for the arrangement of the rolling body cages, the bearing capacity is reduced and said edge loading can occur, which can result in increased wear or even in damage.

In addition, the number of rolling bodies that can be used also decreases in the case of rolling body cages, which in turn has a negative effect on the load bearing capacity of the bearing.

It is therefore the underlying object of the present invention to provide an improved rolling bearing of said prior art, in particular a large rolling bearing, which avoids disadvantages of the prior art and develops the latter in an advantageous manner. In particular, the aim is to keep the rolling bodies spaced apart in a low-friction, space-saving manner and to provide comprehensive, permanent lubrication of the bearing.

SUMMARY

According to the invention, the said problem is solved by a rolling bearing in accordance with claim 1 and an intermediate piece for a rolling bearing in accordance with claim 12. Preferred embodiments of the invention are the subject-matter of the dependent claims.

It is therefore proposed to keep the rolling bodies at a distance by means of intermediate pieces which have a bar structure or skeleton structure that reduces volume and thus creates space. Due to the reduced component volume of the intermediate piece, an increased quantity of lubricant can be introduced into the bearing gap or stored there and at the same time the deposition of old lubricant can be avoided, so that in the vicinity of the rolling contact a better oil release of the lubricant into the loaded contact can be reached or overall a better supply of fresh lubricant to the rolling bodies can be achieved.

According to one aspect of the present invention, the ring portion or outer frame portion of the intermediate piece, which is connected to the central portion by struts, takes the form of a bar structure or skeleton structure with window-like and/or door arch-like cutouts. By using a truss-like outer frame instead of a conventional solid ring, more lubricant can be stored, especially in the area towards the tracks, and the supply of lubricant to the contact points between rolling bodies and tracks can be improved. Said cutouts or openings can act as lubricant pockets in which lubricant can be kept ready in the immediate vicinity of the rolling bodies.

In an advantageous further development of the invention, said cutouts of the bar structure or skeleton structure of the outer frame or outer ring portion can each be formed to be open towards an axial side of the intermediate piece and be encompassed by a U-shaped frame portion, in particular in the form of a U-shaped web frame. In particular, the outer frame or outer ring of the intermediate piece can be formed in a crenellated configuration, preferably with web-like material portions alternating with end face open cutouts when the intermediate piece is viewed in the circumferential direction. This allows lubricant to be stored in the area of the cutouts and delivered to the contact points between the rolling body and the track.

Advantageously, the ring section or frame part of the intermediate piece can have cutouts open towards opposite axial sides, so that open cutouts are provided towards each axial or end face.

The cutouts, which are open on opposite sides, can in principle be arranged to overlap each other when viewed in the direction of running, for example by being formed or encompassed by H-shaped borders.

Advantageously, however, the cutouts open towards opposite axial sides can also be arranged offset from each other, so that, viewed in the circumferential direction, cutouts open towards different axial sides can be provided alternately in the ring portion.

In particular, the cutouts can be open alternately toward opposite axial sides and encompassed by edge webs that form a meandering skeleton structure in the circumferential direction. With such a meandering skeleton structure, a constructive elasticity can be achieved, which on the one hand prevents the respective intermediate piece from tilting, but at the same time avoids an increased frictional resistance.

In order to be able to introduce as much lubricant as possible into the bearing gap, the ratio of material portions to cutouts in the outer frame or ring portion can be relatively small. Advantageously, the material portions of the annular portion or frame part may form less than 50% or less than 30% or even less than 20% of the annular enveloping surface circumferentially enclosing the ring portion of the intermediate piece including the cutouts thereof. In other words, the "bones" of the annular skeleton may constitute or occupy less than half or even less than 1% of the annular enveloping surface.

In the area of the ring portion, more material may be cut out than is left for the skeleton structure. The ring or outer frame portion may have more openings than bones of the skeleton structure.

Advantageously, said skeleton structure may comprise substantially uniformly thin and/or elongated bar portions or bone portions joined together and jointly forming said skeleton structure.

In a further development of the invention, the ring portion or the outer frame part of the intermediate piece may project outwardly beyond the central portion to both axial sides, said central portion being connected to a central portion of the ring portion or outer frame part, as viewed in the axial direction, via the connecting struts. The connecting struts can be articulated approximately centrally on the ring portion, particularly when viewed in the axial direction.

If the ring portion is configured as a skeleton structure as described, for example a meandering skeleton structure, the connecting struts may be attached to bar portions or bone portions of the skeleton structure that extend at least approximately in the axial direction and/or form a side leg of the U-shaped borders of a respective cutout.

According to another aspect of the present invention, the intermediate piece may be contoured such that at least substantially the central portion solely is capable of transmitting force and/or substantially only the central portion forms the force transmitting abutment surface of the intermediate piece to keep the rolling bodies spaced apart in the direction of rotation.

In particular, the connecting struts connecting said central portion to the ring portion or outer frame portion of the intermediate piece may be formed to remain free of contact with the rolling bodies and/or to transmit no forces in the direction of running between the rolling bodies.

For example, said connecting struts may take the form of bar-shaped spokes attached to the central portion on one side and to the outer frame or ring portion on the other side. The spoke-shaped configuration of the connecting struts also creates plenty of space in the annular area around the central portion to receive lubricant. At the same time, the buildup of old, used lubricant can be counteracted.

The said central portion of the intermediate piece, which forms the force-transmitting contact point of the intermediate piece in the direction of running, may be relatively small in size in regard to the overall diameter or thickness or width of the intermediate piece. For example, the central portion may have a thickness or transverse extent (in a direction transverse to running) of less than 50% or less than 30% or less than 20% of the maximum diameter or maximum transverse extent of the intermediate piece.

BRIEF DESCRIPTION OF THE DRAWINGS

The invention is explained in more detail below on the basis of a preferred exemplary embodiment and the corresponding drawings. The drawings show.

DETAILED DESCRIPTION

Figure 1:
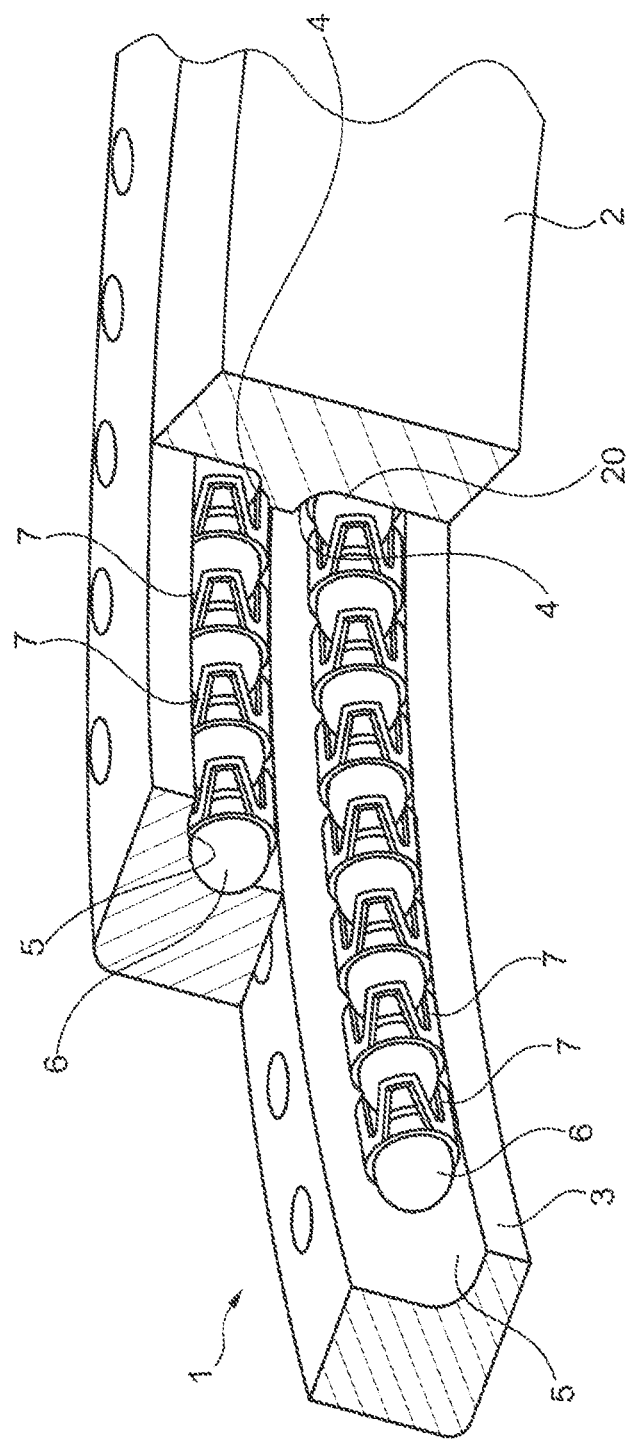
FIG. 1: a partial, cutaway, perspective view of a rolling bearing according to an embodiment of the invention, in which the spherically formed rolling bodies are spaced apart by intermediate pieces.

As FIG. 1 shows, the rolling bearing 1 can be configured as a pivot bearing, for example in the form of an open centered large rolling bearing, and can have two bearing rings 2, 3, for example in the form of an inner ring and an outer ring, wherein the bearing can take the form of a axial bearing or a radial bearing or also a mixed form that supports both axial forces and radial forces.

When configured as a linear bearing, instead of the two bearing rings 2, 3 shown in FIG. 1, there can also be provided corresponding bearing track bodies which then extend linearly and can be configured, for example, in the form of rails.

Figure 2:
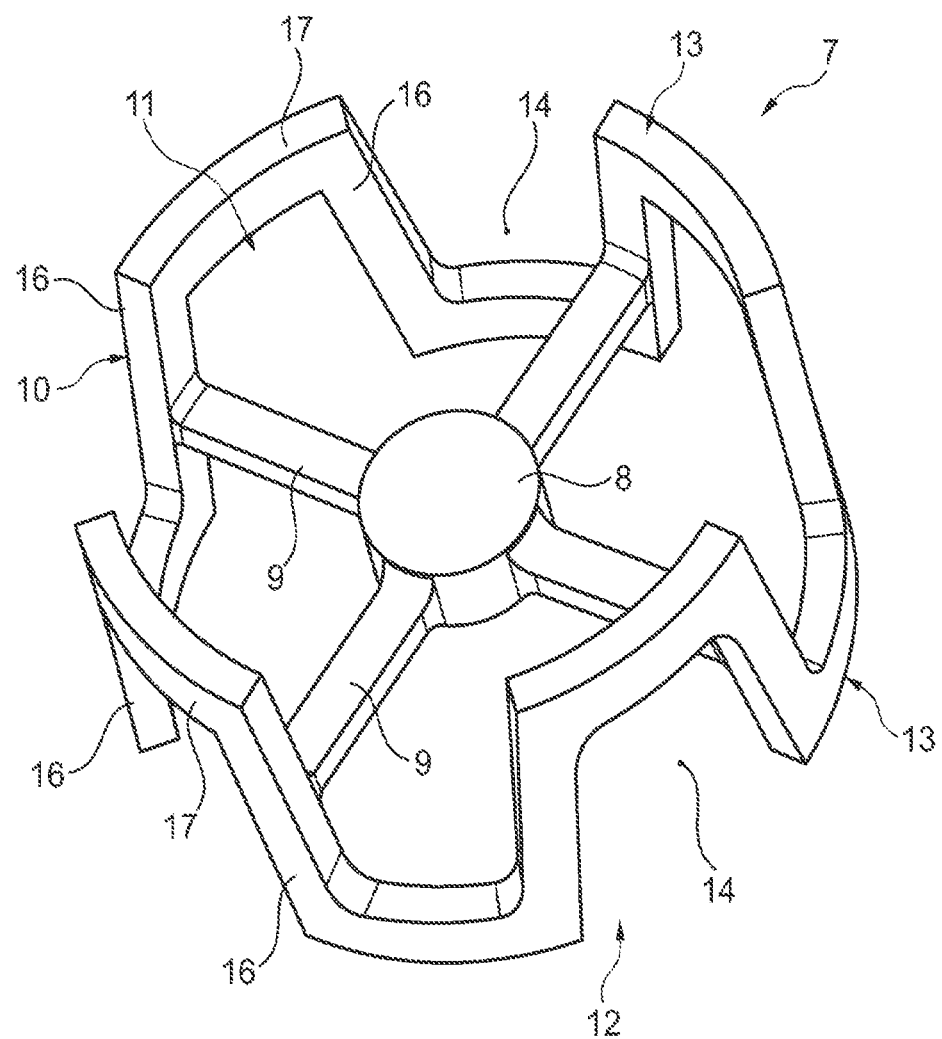
FIG. 2: a perspective view of an intermediate piece of the rolling bearing of FIG. 1 according to an advantageous embodiment of the invention.

As FIG. 2 shows, the rolling bearing 1 may comprise two bearing rows, which may be arranged, for example, on opposite sides of an ring nose with which one bearing ring 2 can engage in a groove in the other bearing ring 3. However, the rolling bearing 1 can also comprise only one rolling bearing row or more than two rolling bearing rows, wherein axial and radial rows can be combined with one another or can also be provided individually.

In this respect, the bearing rings 2, 3 can each have a track 4 or 5 for each rolling body row, which face each other and are supported against each other by a row of rolling bodies 6 that roll on said tracks 4 and 5.

As FIG. 1 shows, the rolling bodies 6 can, for example, take the form of a spherical shape. Accordingly, the tracks 4 and 5 can each be configured to be curved in the shape of a shell or half-shell to nestle up against the spherical rolling bodies 6. Alternatively, partial-shell tracks can be provided in which the rolling bodies 6 run if the bearing takes the form of a multi-point bearing, for example a four-point bearing. However, it is understood that other rolling bodies, for example cylindrical or barrel-shaped rolling bodies, can also be provided and the tracks 4 and 5 can then be adapted to the rolling bodies 6 in a correspondingly different manner.

Intermediate pieces 7 are arranged between the rolling bodies 6 to keep the rolling bodies 6 spaced apart and ensure uniform distribution of the rolling bodies 6 along the tracks 4, 5. In this respect, there can be provided, between each two adjacent rolling bodies 6, an intermediate piece 7.

The said intermediate pieces 7 can be configured separately from each other or unconnected.

As FIG. 2 shows, the intermediate pieces 7 each have a skeleton structure that can include openings both in the direction of running and transverse to the direction of running. The absence of closed cross-sections in the axial direction and/or in the radial direction means that lubricant can be replaced or supplied past the intermediate pieces 7 and deposits of old, used lubricant in the area of the intermediate pieces can be avoided.

As shown in FIGS. 2 to 5, the intermediate piece 7 comprises a central portion 8 connected by connecting struts 9 to an outer frame part 10, which may be annularly configured and surround the central portion 8.

The said central portion 8 forms the force-transmitting abutment surfaces in the direction of running of the rolling bearing row, which can keep the respective adjacent rolling bodies 6 spaced apart or against which the said rolling bodies 6 can abut.

The outer frame part 10, which is significantly larger in diameter or transverse extent, holds the central portion 8 in position and keeps said central portion 8 from tilting. For this purpose, said frame part 10 can overlap the adjacent rolling bodies 6, which are kept at a distance, to a certain extent in order to be able to support itself as the case may be.

Figure 5:
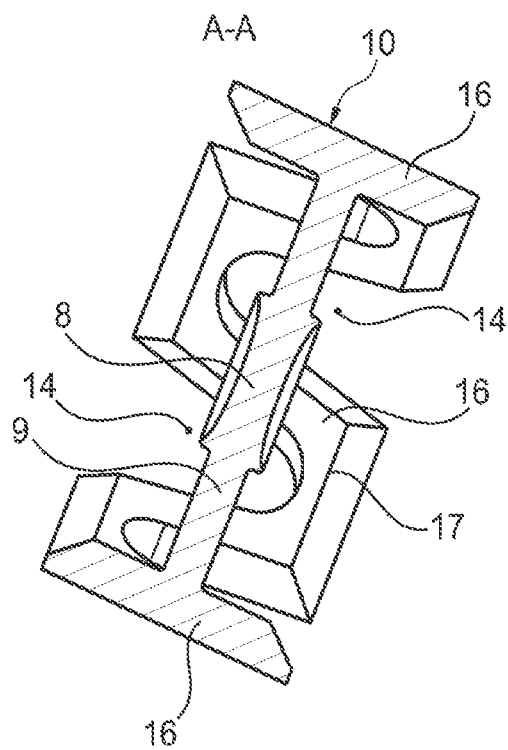
FIG. 5: a sectional view of the intermediate piece along line A-A in FIG. 4.

In particular, the intermediate piece 7 can have receiving spaces 11, 12 towards opposite end faces, cf. FIG. 5, which allow the rolling bodies 6, which are spaced apart, to dip a short distance into the space enclosed by the frame part 10 or into the body of the intermediate piece. The end margins 13 of the frame part 10 can be matched in their diameter or clear width to the contour of the rolling body 6 to such an extent that the rolling bodies 6, which are held at a distance, can support the frame part 10 against tilting.

Figure 3:
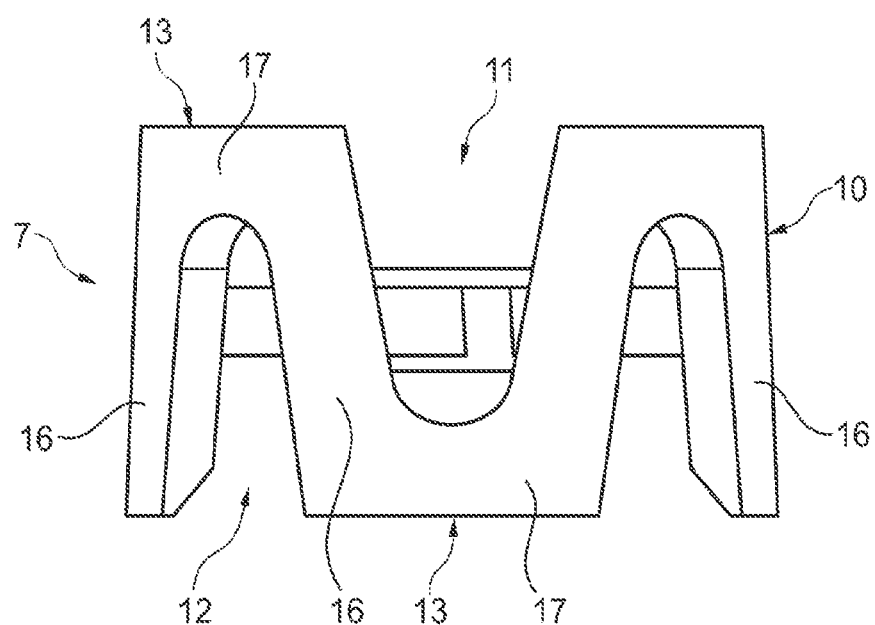
FIG. 3: a side view of the intermediate piece of FIG. 1, showing the meandering skeleton shape of the outer ring portion of the intermediate piece.

As shown in FIGS. 2 and 3, the outer frame part 10 is provided with cutouts 14 and has a bar structure or skeleton structure interspersed with said cutouts 14. In particular, said skeleton structure of the frame part 10 may be formed by elongated, bar-shaped or bone-shaped struts 16 and 17 connected to each other in a chain-like or polygon-like manner and forming overall a meandering skeleton structure extending in the circumferential direction of the intermediate piece 7 or around the central portion 8.

In particular, the skeleton structure of the frame part 10 may comprise longitudinal struts 16 arranged in a circumferentially distributed manner spaced apart from each other and connected to each other in pairs by cross-struts 17. Said longitudinal struts 16 may extend approximately in the direction of running or inclined at an acute angle thereto, while said cross-struts 17 extend substantially transverse to the direction of running of the rolling body row.

A pair of adjacent longitudinal struts 16, together with a cross-strut 17 connecting the two longitudinal struts 16, can form a U-shaped frame enclosing a cutout 14.

Said cutouts 14 may each be open to one axial side, advantageously providing alternate recesses 14 open to the front and rear, so that the intermediate piece 7 comprises cutouts 14 open to each axial side. In particular, viewed in the circumferential direction of the intermediate piece 7, a cutout 14 open towards a first axial side can alternate with a cutout 14 open towards the opposite axial side. Adjacent cutouts 14 face each other with their openings toward opposite sides.

Corresponding to the meandering course of the skeleton structure of the frame part 10, the cross-struts 17 are arranged alternately at opposite edge portions of the frame part 10, i.e., viewed in the direction of running, once at a front edge portion and once at a rear edge portion, cf. FIG. 3.

Due to the skeletal, in particular meander-shaped configuration of the frame part 10, the frame part 10 has a shape-related structural elasticity, in particular due to bending or deformation of the connecting sections between the longitudinal and cross-struts 16, 17, which act as joints.

The connecting struts 9, which connect the central portion 8 to the frame part 10, can advantageously take the form of approximately bar-shaped spokes, which can have an at least approximately straight course. In particular, said spoke-shaped connecting struts 9 may extend in a radial plane transverse to the direction of running of the rolling body row.

Figure 4:
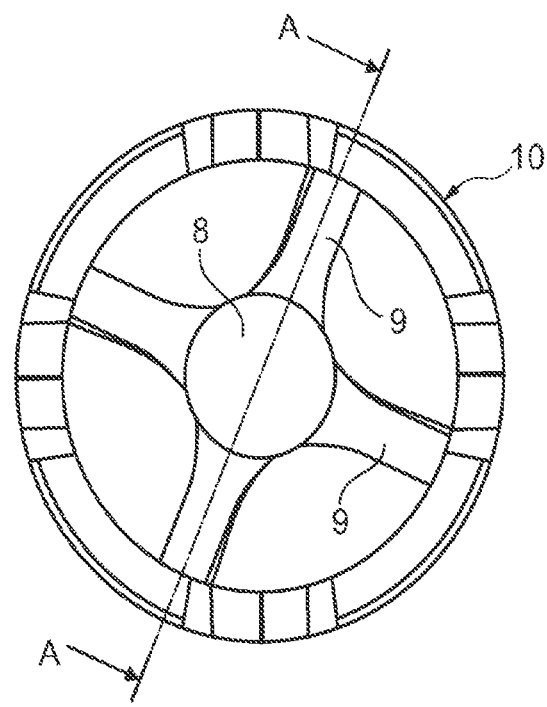
FIG. 4: an end face plan view of the intermediate piece of the foregoing figures, showing the spoke-shaped connecting struts between the central portion and the outer ring portion.

The connecting struts 9 can extend radially, cf. FIG. 4. Regardless thereof, there can be provided from 2 to 8 or from 3 to 6 or from 4 to 5, for example, 4 spokes. This is sufficient to provide a sufficiently stable connection between the frame part 10 and the central portion 8, and at the same time creates space to receive lubricant.

As FIG. 4 shows, the annular area between the central portion 8 and the frame part 10 bridged by the connecting struts 9 may include relatively large openings or material-free areas. For example, the connecting struts 9 may comprise less than 50% or less than 30% of said annular area. In other words, viewed in the direction of running, there are more openings than spokes in terms of surface area.

The connecting struts 9 can advantageously be such that they do not come into contact with the rolling bodies 6. For example, the central portion 8 can project with its opposing abutment surfaces 18, 19 in the direction of running or against the direction of running over said connecting struts 9. If one considers two—hypothetical—parallel planes which abut against the opposite abutment surfaces 18 and 19 and extend perpendicularly to the direction of running of the rolling body row, the said connecting struts 9 can extend in the space between the two imaginary planes, cf. FIG. 5.

The connecting struts 9 can be configured thinner than the central portion 8 when viewed in the direction of running of the rolling body row, cf. FIG. 5.

The connecting struts 9 may each be attached to a middle portion of the frame part 10, so that the frame part 10 projects approximately evenly with respect to the connecting struts 9 toward opposite sides. In particular, the connecting struts 9 can each be articulated approximately centrally on longitudinal struts 16, cf. FIG. 2 and FIG. 5.

We claim:

1. A rolling bearing comprising:
   two concentric rings;
   rolling bodies which roll on at least two tracks, wherein the rolling bodies are in a curve of the at least two tracks; and
   intermediate pieces which keep the rolling bodies spaced apart from one another, and wherein the intermediate pieces each comprise a central portion connected via connecting struts to an outer frame part surrounding the central portion, wherein the central portion is integrally formed with the connecting struts and the outer frame part;
   wherein the outer frame part comprises one or more cutouts;
   wherein the one or more cutouts are alternately open towards opposite axial end faces of the intermediate piece and are encompassed by frame struts in a circumferential direction of the intermediate piece; and
   wherein the central portion in a running direction of a rolling body row transmits force between the rolling bodies that are spaced apart and abutment surfaces that keep adjacent rolling bodies spaced apart on said central portion, wherein the force is only transmitted by the central portion, wherein the connecting struts and the outer frame part does not transmit the force.

2. The rolling bearing of claim 1, wherein the one or more cutouts are open towards an end face of the intermediate piece and are encompassed by a U-shaped frame part comprising a U-shaped web frame.

3. The rolling bearing of claim 1, wherein material portions of the outer frame part between the cutouts form less than 50% of an annular enveloping surface of the outer frame part circumferentially enclosing the outer frame part including the cutouts.

4. The rolling bearing of claim 1, wherein the outer frame part comprises alternating longitudinal struts and cross-struts.

5. The rolling bearing of claim 1, wherein the outer frame part projects outwardly beyond the central portion towards both end faces of the intermediate piece and/or has a length in the direction of running of a rolling body row which is more than twice the length of the central portion.

6. The rolling bearing of claim 1, wherein the connecting struts between the central portion and the outer frame part are connected to a middle portion of the outer frame part between end margins of the outer frame part and/or extend in a common plane perpendicular to a running direction of a rolling body row.

7. The rolling bearing of claim 1, wherein the connecting struts between the central portion and the outer frame part comprise bar-shaped spokes.

8. The rolling bearing of claim 1, wherein the connecting struts are thinner in a running direction of a rolling body row than the central portion.

9. The rolling bearing of claim 1, wherein the connecting struts between the central portion and the outer frame part are free of contact with the rolling bodies.

10. The rolling bearing of claim 1, wherein an annular area between the central portion and the outer frame part bridged by the connecting struts is formed less than 50% by the connecting struts and comprises more than 50% of openings.

11. The rolling bearing of claim 1, wherein an annular area between the central portion and the outer frame part bridged by the connecting struts is formed less than 30% by the connecting struts.

12. The rolling bearing of claim 1, wherein an annular area between the central portion and the outer frame part bridged by the connecting struts comprises more than 70% of openings.

13. The rolling bearing of claim 1, wherein an annular area between the central portion and the outer frame part bridged by the connecting struts is formed less than 30% by the connecting struts and comprises more than 70% of openings.

14. The rolling bearing of claim 1, wherein the rolling bearing comprises a diameter greater than 0.5 m.

15. An intermediate piece for insertion between rolling bodies of a rolling bearing, comprising:
    a central portion;
    an outer frame part surrounding the central portion, wherein the outer frame part comprises with one or more cutouts;
    connecting struts connecting the central portion to the outer frame part;
    wherein the one or more cutouts are alternately open towards opposite axial end faces of the intermediate piece and are encompassed by frame struts in a circumferential direction of the intermediate piece; and
    wherein the central portion in a running direction of a rolling body row transmits force between the rolling bodies that are spaced apart and abutment surfaces that keep adjacent rolling bodies spaced apart on said central portion, wherein the force is only transmitted by the central portion, wherein the connecting struts and the outer frame part does not transmit the force.

* * * * *